United States Patent
Lo et al.

(10) Patent No.: US 9,036,151 B2
(45) Date of Patent: May 19, 2015

(54) OPTICAL PARAMETER MEASURING APPARATUS AND OPTICAL PARAMETER MEASURING METHOD

(75) Inventors: Yu-Lung Lo, Tainan (TW);
Thi-Thu-Hien Pham, Tainan (TW)

(73) Assignee: National Cheng Kung University, Tainan (TW)

( * ) Notice: Subject to any disclaimer, the term of this patent is extended or adjusted under 35 U.S.C. 154(b) by 535 days.

(21) Appl. No.: 13/339,167

(22) Filed: Dec. 28, 2011

(65) Prior Publication Data
US 2012/0212742 A1 Aug. 23, 2012

(30) Foreign Application Priority Data
Feb. 18, 2011 (TW) .................. 100105444

(51) Int. Cl.
*G01J 4/00* (2006.01)
*G01J 4/04* (2006.01)

(52) U.S. Cl.
CPC ......................................... *G01J 4/04* (2013.01)

(58) Field of Classification Search
CPC .............. G01J 4/00–4/04; G01J 3/447; G01N 2021/21–2021/218
USPC .......................................................... 356/364
See application file for complete search history.

(56) References Cited

U.S. PATENT DOCUMENTS

| | | | |
|---|---|---|---|
| 5,045,701 A * | 9/1991 | Goldstein et al. | 250/339.08 |
| 5,247,176 A * | 9/1993 | Goldstein | 356/368 |
| 6,384,916 B1 * | 5/2002 | Furtak | 356/369 |
| 7,837,833 B2 * | 11/2010 | Jez et al. | 162/198 |
| 2004/0129867 A1 * | 7/2004 | Mackey | 250/225 |
| 2006/0056029 A1 * | 3/2006 | Ye | 359/578 |
| 2009/0051916 A1 * | 2/2009 | Otani et al. | 356/364 |
| 2009/0213374 A1 * | 8/2009 | Otani et al. | 356/364 |
| 2009/0296089 A1 * | 12/2009 | Smith | 356/367 |
| 2010/0245822 A1 * | 9/2010 | Garab et al. | 356/365 |

OTHER PUBLICATIONS

Handbook of Optics vol. II Devices, Measurements, and Properties, Second Edition, McGraw-Hill Inc.—Chapter 22—Polarimetry, 1995.*
Otani et al, Spectroscopic Mueller matrix polarimeter using four channel spectra, optics communication 281 (2008), pp. 5725-5730.*
Theodore C Oakberg, Stokes Polarimetry, HINDS Instruments, Inc., 2009 pp. 1-5.*

(Continued)

*Primary Examiner* — Michael A Lyons
(74) *Attorney, Agent, or Firm* — Muncy, Geissler, Olds & Lowe, P.C.

(57) ABSTRACT

An optical parameter measuring apparatus for measuring optical parameters of an object includes a light source, a polarizing module, a Stokes polarimeter and a calculating module. The light source emits a light which is polarized by the polarizing module and received by the Stokes polarimeter. According to the light information generated by the Stokes polarimeter, Mueller matrixes of linear birefringence, circular birefringence, linear dichroism, circular dichroism and linear/circular depolarization of the object, and Stokes vector established according to the Mueller matrixes, the calculating module calculates the optical parameters.

17 Claims, 8 Drawing Sheets

(56) References Cited

OTHER PUBLICATIONS

Yohji et al., New Type of CD spectropolarimeter with LD option, Review of Scientific Instruments 64, May 1993, pp. 1161-1168.*

Savenkov, Sergey et al. "Extraction of the Mueller-Jones part constructed on basis of four anisotropy mechanisms out of experimental determinstic Mueller matrix". Proc. SPIE 5024, Selected Papers on Optics and Photonics: Optical Diagnostics of Materials and Devices for Opto-, Micro-, and Quantum Electronics, Apr. 1, 2003, pp. 209-215.*

* cited by examiner

OPTICAL PARAMETER MEASURING APPARATUS AND OPTICAL PARAMETER MEASURING METHOD

BACKGROUND

1. Technical Field

Aspects of the exemplary embodiments relate to an optical parameter measuring apparatus and optical parameter measuring approach, and more specifically, to an optical parameter measuring apparatus and optical parameter measuring approach taking use of Mueller matrixes and Stokes vector.

2. Related Art

Related art derivative products for the application of optical technology have extended to areas including displays, biological medicine and materials. Related art techniques exist with respect to optical parameter measuring approaches, including the measuring of linear birefringence of liquid crystal display (LCD's) compensator films, parameter measuring of circular birefringence for diabetics, parameter measuring of circular dichroism for protein structures, parameter measuring of linear dichroism for tumors, as well as the parameter measuring of scattering materials' surfaces of linear depolarization and circular depolarization.

However, the related art optical parameter measuring apparatus measures only the optical parameter to some parts and some objects, but cannot extensively measure optical parameters, including, DSM 20 CD produced by OLIS. Co (US). The related art techniques can only measure the circular dichroism parameter of protein structures, and further, the related art apparatus is influenced by some non-circular-dichroism parameter, for example, LB, CB, LD, L-Dep, C-Dep and so on. Therefore, in related art optical parameter measuring apparatuses, the target could be measured until the pretreatment and purge process.

Consequently, there is an unmet need to offer an optical parameter measuring apparatus and optical parameter measuring approach which can handle extensive measuring to a target. There is also an unmet need to avoid the complicated pretreatment and the purge process, and improve efficiency.

SUMMARY

It is a non-limiting object of the exemplary embodiments to offer an optical parameter measuring apparatus and optical parameter measuring method which can handle extensive measuring to the optical parameter of one target. The exemplary embodiments may avoid complicated pretreatment and the purge process, and may further improve efficiency.

According to the exemplary embodiments, an optical parameter measuring apparatus for measuring optical parameters of an object includes a light source, a polarizing module, a Stokes polarimeter and a calculating module. The light source emits a light which is polarized by polarizing module and the polarizing light is received by the Stokes polarimeter. According to the light information generated by the Stokes polarimeter, Mueller matrixes of linear birefringence, circular birefringence, linear dichroism, circular dichroism and linear/circular depolarization of the object and Stokes vector established according to the Mueller matrixes, the calculating module calculates the matrixes of optical parameters.

According to one exemplary embodiment, a polarizing module consists of a polarizer, a wave plate or its components. Linear polarizing lights with at least four different angles as well as left-circular polarizing lights and right-circular polarizing lights are generated.

In another exemplary embodiment, the optical parameter of Mueller matrixes of linear birefringence with slow axis orientation angle and retardance, the optical parameter of Mueller matrixes of linear dichroism with orientation axis angle and linear dichroism, optical parameter of Mueller matrixes of circular birefringence with optical rotation angle, optical parameter of Mueller matrixes of circular dichroism with value of circular amplitude anisotropy.

In yet another exemplary embodiment, according to Mueller matrixes of linear depolarization and circular depolarization of the object as well as Stokes vector, the calculating module calculates the optical parameters of Mueller matrixes of linear depolarization and circular depolarization. For example, Mueller matrixes of linear depolarization and circular depolarization includes optical parameter of plural degrees of linear depolarization and optical parameter of a circular degree of circular depolarization.

In another exemplary embodiment, the object could be an optical object comprising anisotropic or scattering anisotropic.

According to an exemplary embodiment, at least one part of the Mueller matrixes is the identity matrix.

According to the exemplary embodiments, an optical parameter measuring process is provided to measure optical parameter of the object, including: establishing Mueller matrixes of linear birefringence of the object, establishing Mueller matrixes of circular birefringence of the object, to establish Mueller matrixes of linear dichroism of the object, establishing Mueller matrixes of circular dichroism of the object, and establishing Stokes vector according to these Mueller matrixes, to irradiate the object with at least six different polarizing lights.

One exemplary embodiment comprises the optical parameter of Mueller matrixes of linear birefringence with slow axis orientation angle and retardance, the optical parameter of the Mueller matrixes of linear dichroism with orientation axis angle and dichroism, the optical parameter of this Mueller matrixes of circular dichroism with optical rotation angle, the optical parameter of the Mueller matrixes of circular dichroism with value of circular amplitude anisotropy.

Another exemplary embodiment includes an optical parameter measuring process comprising establishment of Mueller matrixes of linear depolarization and circular depolarization, as well as Stokes vector according to these Mueller matrixes. Among it, the Mueller matrixes of linear depolarization and circular depolarization consist of optical parameter of degrees of linear depolarization and optical parameter of degree of circular depolarization.

Accordingly, the exemplary embodiments may create an unprecedented derivate model for an optical parameter including establishing the Mueller matrixes of linear birefringence of the object, Mueller matrixes of circular birefringence of the object, Mueller matrixes of linear dichroism of the object, and Mueller matrixes of circular dichroism of the object. Further, Mueller matrixes of linear depolarization and circular depolarization of the object can be established to the object with scattering properties, and the Stokes vector is established according to these Mueller matrixes. Thus, nine optical parameters in the above optical properties can be solved in the form of decoupling. In other words, there are substantially no interferences among optical parameters and there is substantially no cross-talk effect.

Accordingly, the exemplary embodiments substantially integrate optical parameter measuring in a single measuring apparatus. Further, an optical parameter measuring apparatus and optical parameter measuring approach of this exemplary embodiment does not require parallel birefringence axis and dichroism axis of the object, and the range of measuring objects are extended.

DETAILED DESCRIPTION

The following examples refer to the disclosures to show an optical parameter measuring apparatus to this inventive concept. The same components will be illustrated with the same reference marks.

Figure 1:
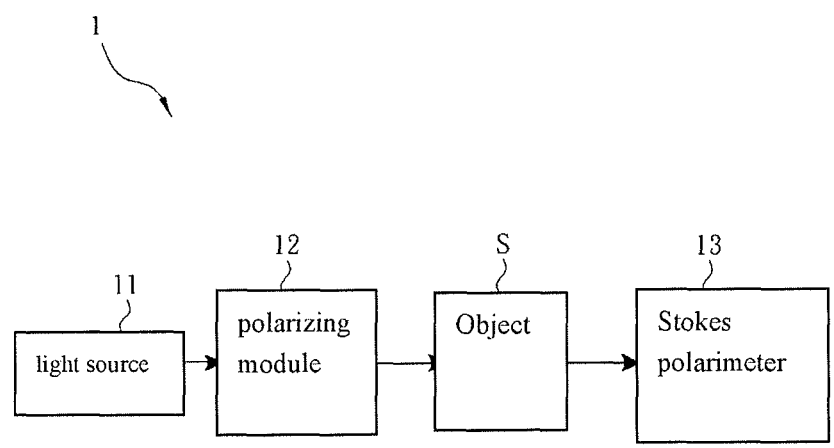
FIG. 1 illustrates a schematic diagram of an exemplary optical parameter measuring apparatus.

FIG. 1 is the sketch map of the optimized example of optical parameter measuring apparatus 1 according to an exemplary embodiment. Optical parameter measuring apparatus 1 is measures an optical parameter of object S, and consists of a light source 11, a polarizing module 12, a Stokes polarimeter 13 and a calculating module (not shown in this Figure).

This exemplary embodiment is directed to the category or applied range of the object S and it can include any target materials. For example, but not by way of limitation, such target material may include, tissue of a biological section, an optical components or the like. The object S could include anisotropic optical properties or scattering anisotropic optical properties. In the exemplary embodiment, object S is of anisotropic but no scattering optical property. However, the exemplary embodiments are not limited thereto, and an equivalent could be substituted therefor without departing from the scope of the inventive concept, as would be understood by those skilled in the art.

The light source 11 emits light which could be the light source of visible light, light source of infrared, ultraviolet light source. Light source 11 could be the laser light source or broadband light source. The exemplary embodiment is not limited by the category, waveband and other aspects of the light emitted by light source 11. In this exemplary embodiment, light source 11 is He—Ne laser light source.

When light source 11 emits, polarizing module 12 turns the light to at least one polarizing light, such as linear polarizing light with different angles or left-handed circular polarizing light or right-handed circular polarizing light. Polarizing module 12 may consist of a polarizer, wave plate or other polarizing components or a combination thereof. In this exemplary embodiment, on the basis of polarizing module 12, light could acquire various linear polarizing and circular polarizing effects over time.

When the light is polarized, polarizing light is received by Stokes polarimeter 13 after going through object S. After that, it is analyzed, calculated and other processes performed by the calculating module, and then the optical parameter of object S could be determined.

Figure 2:
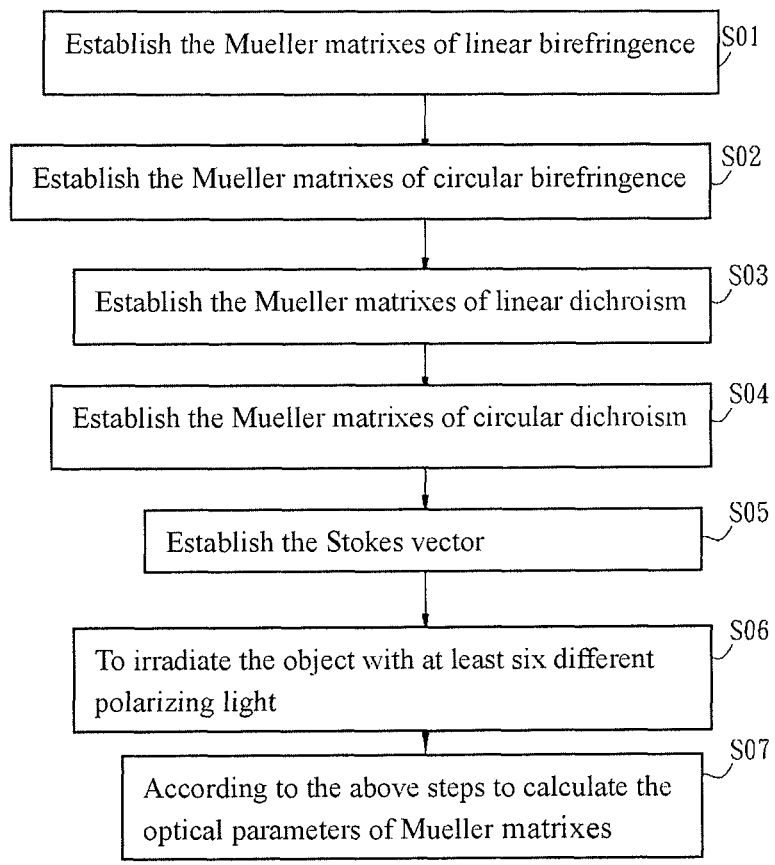
FIG. 2 illustrates a flow chart of an exemplary optical parameter measuring approach.

FIG. 2 is a flow chat of an exemplary optical parameter measuring process, to establish Mueller matrixes of linear birefringence of object S (S01), to establish Mueller matrixes of circular birefringence of object S (S02), to establish Mueller matrixes of linear dichroism of object S (S03), to establish Mueller matrixes of circular dichroism of object S (S04), to establish Stokes vector in accordance with these Mueller matrixes (S05), to irradiate the object S with at least six different polarizing lights (S06), to calculate optical parameter of this Mueller matrixes in accordance with the operations (S07).

In reference to FIG. 1 and FIG. 2, a further exemplary, non-limiting illustration is provided with respect to the exemplary optical parameter measuring apparatus and optical parameter measuring approach.

Firstly, S01 to S04 establishes Mueller matrixes with optical properties of the object S which include Mueller matrixes of linear birefringence, Mueller matrixes of circular birefringence, Mueller matrixes of linear dichroism, Mueller matrixes of circular dichroism. The sequence of S01 through S04 can be varied without departing from the scope of the inventive concept.

The Mueller matrixes of linear birefringence are established as follows:

$$M_{lb} = \begin{pmatrix} 1 & 0 & 0 & 0 \\ 0 & \cos(4\alpha)\sin^2(\beta/2) + \cos^2(\beta/2) & \sin(4\alpha)\sin^2(\beta/2) & \sin(2\alpha)\sin(\beta) \\ 0 & \sin(4\alpha)\sin^2(\beta/2) & -\cos(4\alpha)\sin^2(\beta/2) + \cos^2(\beta/2) & -\cos(2\alpha)\sin(\beta) \\ 0 & -\sin(2\alpha)\sin(\beta) & \cos(2\alpha)\sin(\beta) & \cos(\beta) \end{pmatrix} \quad (1)$$

Two optical parameters provided include slow axis orientation angle α and retardance β.

Mueller matrixes of linear dichroism are established as follows:

$$M_{ld} = \tag{2}$$

$$\begin{pmatrix} \frac{1}{2}\left(1+\frac{1-D}{1+D}\right) & \frac{1}{2}\cos(2\theta_d)\left(1-\frac{1-D}{1+D}\right) & \frac{1}{2}\sin(2\theta_d)\left(1-\frac{1-D}{1+D}\right) & 0 \\ \frac{1}{2}\cos(2\theta_d)\left(1-\frac{1-D}{1+D}\right) & \frac{1}{4}\left(\left(1+\sqrt{\frac{1-D}{1+D}}\right)^2+\cos(4\theta_d)\left(1-\sqrt{\frac{1-D}{1+D}}\right)^2\right) & \frac{1}{4}\sin(4\theta_d)\left(1-\sqrt{\frac{1-D}{1+D}}\right)^2 & 0 \\ \frac{1}{2}\sin(2\theta_d)\left(1-\frac{1-D}{1+D}\right) & \frac{1}{4}\sin(4\theta_d)\left(1-\sqrt{\frac{1-D}{1+D}}\right)^2 & \frac{1}{4}\left(\left(1+\sqrt{\frac{1-D}{1+D}}\right)^2-\cos(4\theta_d)\left(1-\sqrt{\frac{1-D}{1+D}}\right)^2\right) & 0 \\ 0 & 0 & 0 & \sqrt{\frac{1-D}{1+D}} \end{pmatrix}$$

Optical parameters include orientation axis angle $\theta_d$ and dichroism D.

Mueller matrixes of circular birefringence are established as follows:

$$M_{cb} = \begin{pmatrix} 1 & 0 & 0 & 0 \\ 0 & \cos(2\gamma) & \sin(2\gamma) & 0 \\ 0 & -\sin(2\gamma) & \cos(2\gamma) & 0 \\ 0 & 0 & 0 & 1 \end{pmatrix} \tag{3}$$

The optical parameter includes optical rotation angle $\gamma$.

Mueller matrixes of circular dichroism are established as follows:

$$M_{cd} = \begin{bmatrix} 1+R^2 & 0 & 0 & 2R \\ 0 & 1-R^2 & 0 & 0 \\ 0 & 0 & 1-R^2 & 0 \\ 2R & 0 & 0 & 1+R^2 \end{bmatrix} \tag{4}$$

The optical parameter includes value of circular amplitude anisotropy R.

The 4 Mueller matrixes include 6 optical parameters.

Referring to S05 for example, a Stokes vector is established in accordance with these Mueller matrixes:

$$S_c = \begin{bmatrix} S_0 \\ S_1 \\ S_2 \\ S_3 \end{bmatrix}_c = [M_{lb}][M_{cb}][M_{ld}][M_{cd}] \tag{5}$$

$$\hat{S}_c = \begin{pmatrix} m_{11} & m_{12} & m_{13} & m_{14} \\ m_{21} & m_{22} & m_{23} & m_{24} \\ m_{31} & m_{32} & m_{33} & m_{34} \\ m_{41} & m_{42} & m_{43} & m_{44} \end{pmatrix} \begin{pmatrix} \hat{S}_0 \\ \hat{S}_1 \\ \hat{S}_2 \\ \hat{S}_3 \end{pmatrix}_c$$

Accordingly, the following equations are deduced in accordance with (5):

$$m_{11} = \frac{1}{2}\left(1+\frac{1-D}{1+D}\right)(1+R^2) \tag{6}$$

$$m_{12} = \frac{1}{2}\left(1-\frac{1-D}{1+D}\right)\cos(2\theta_d)(1-R^2) \tag{7}$$

$$m_{13} = \frac{1}{2}\left(1-\frac{1-D}{1+D}\right)\sin(2\theta_d)(1-R^2) \tag{8}$$

$$m_{14} = \left(1+\frac{1-D}{1+D}\right)R \tag{9}$$

Then, to irradiate the object S with at least six different polarizing light (S06), such as the four linear polarizing light of 0°, 45°, 90°, 135°, right-handed circular polarizing light and left-handed circular polarizing light, and 6 light information could be produced by Stokes polarimeter, consequently, the above six optical parameters can be solved.

Stokes vectors point to the four linear polarizing light of 0°, 45°, 90°, 135°, as well as right-handed circular polarizing light and left-handed circular polarizing light, they are:

$$\hat{S}_{0°} = [1,1,0,0]^T$$

$$\hat{S}_{45°} = [1,0,1,0]^T$$

$$\hat{S}_{90°} = [1,-1,0,0]^T$$

$$\hat{S}_{135°} = [1,0,-1,0]^T$$

$$\hat{S}_{RHC} = [1,0,0,1]^T$$

$$\hat{S}_{LHC} = [1,0,0,-1]^T$$

Consequently, the following results are acquired in accordance with equation (5):

$$S_{0°} = [m_{11}+m_{12}, m_{21}+m_{22}, m_{31}+m_{32}, m_{41}+m_{42}]^T \tag{10}$$

$$S_{45°} = [m_{11}+m_{13}, m_{21}+m_{23}, m_{31}+m_{33}, m_{41}+m_{43}]^T \tag{11}$$

$$S_{90°} = [m_{11}-m_{12}, m_{21}-m_{22}, m_{31}-m_{32}, m_{41}-m_{42}]^T \tag{12}$$

$$S_{135°} = [m_{11}-m_{13}, m_{21}-m_{23}, m_{31}-m_{33}, m_{41}-m_{43}]^T \tag{13}$$

$$S_{RHC} = [m_{11}+m_{14}, m_{21}+m_{24}, m_{31}+m_{34}, m_{41}+m_{44}]^T \tag{14}$$

$$S_{LHC} = [m_{11}-m_{14}, m_{21}-m_{24}, m_{31}-m_{34}, m_{41}-m_{44}]^T \tag{15}$$

Thus, optical parameters are obtained:

$$2\theta_d = \tan^{-1}\left(\frac{S_{45°}(S_0)-S_{135°}(S_0)}{S_{0°}(S_0)-S_{90°}(S_0)}\right) \tag{16}$$

$$D = \sqrt{\frac{(S_{0°}(S_0) - S_{90°}(S_0))^2 + (S_{45°}(S_0) - S_{135°}(S_0))^2}{(S_{0°}(S_0) + S_{90°}(S_0))^2 - (S_{RHC}(S_0) - S_{LHC}(S_0))^2}} \quad (17)$$

Or $$D = \frac{[S_{0°}(S_0) - S_{90°}(S_0)]}{\cos(2\theta_d)\left[\sqrt{(S_{0°}(S_0) + S_{90°}(S_0))^2 - (S_{RHC}(S_0) - S_{LHC}(S_0))^2}\right]} \quad (18)$$

Or $$D = \frac{[S_{45°}(S_0) - S_{135°}(S_0)]}{\sin(2\theta_d)\left[\sqrt{(S_{0°}(S_0) + S_{90°}(S_0))^2 - (S_{RHC}(S_0) - S_{LHC}(S_0))^2}\right]} \quad (19)$$

$$R = \frac{[S_{0°}(S_0) + S_{90°}(S_0)] - \left[\sqrt{(S_{0°}(S_0) + S_{90°}(S_0))^2 - (S_{RHC}(S_0) - S_{LHC}(S_0))^2}\right]}{[S_{RHC}(S_0) - S_{LHC}(S_0)]} \quad (20)$$

Thus far, three optical parameters have been solved: orientation axis angle $\theta_d$, linear dichroism D, value of circular amplitude anisotropy R.

Next, the following Mueller matrixes are established, and then the three remaining optical parameters are solved.

Mueller matrixes of dichroism:

$$M_D = [M_{ld}][M_{cd}] = \begin{pmatrix} B_{11} & B_{12} & B_{13} & B_{14} \\ B_{12} & B_{22} & B_{23} & B_{24} \\ B_{13} & B_{23} & B_{33} & B_{34} \\ B_{41} & B_{42} & B_{43} & B_{44} \end{pmatrix} \quad (21)$$

Mueller matrixes of birefringence:

$$M_B = [M_{lb}][M_{cb}] = \begin{pmatrix} 1 & A_{12} & A_{13} & A_{14} \\ A_{21} & A_{22} & A_{23} & A_{24} \\ A_{31} & A_{32} & A_{33} & A_{34} \\ A_{41} & A_{42} & A_{43} & A_{44} \end{pmatrix} \quad (22)$$

Mueller matrixes of birefringence and dichroism:

$$M_{BD} = M_B M_D = \quad (23)$$

$$\begin{pmatrix} B_{11} & B_{12} & B_{13} & B_{14} \\ A_{22}B_{12} + A_{23}B_{13} + A_{24}B_{41} & A_{22}B_{22} + A_{23}B_{23} & A_{22}B_{23} + A_{23}B_{33} & A_{22}B_{24} + A_{23}B_{34} + A_{24}B_{44} \\ A_{32}B_{12} + A_{33}B_{13} + A_{34}B_{41} & A_{32}B_{22} + A_{33}B_{23} & A_{32}B_{23} + A_{33}B_{33} & A_{32}B_{24} + A_{33}B_{34} + A_{34}B_{44} \\ A_{42}B_{12} + A_{43}B_{13} + A_{44}B_{41} & A_{42}B_{22} + A_{43}B_{23} & A_{42}B_{23} + A_{43}B_{33} & A_{42}B_{24} + A_{43}B_{34} + A_{44}B_{44} \end{pmatrix}$$

then the following can be obtained:

$$\alpha = \frac{1}{2}\tan^{-1}\left(-\frac{A_{24}}{A_{34}}\right) \quad (24)$$

thereinto, $A_{24} = \sin(2\alpha)\sin(\beta)$ (25)

$$A_{34} = -\cos(2\alpha)\sin(\beta) \quad (26)$$

$$\beta = \tan^{-1}\left(-\frac{A_{34}}{\cos(2\alpha)A_{44}}\right) \quad (27)$$

thereinto, $A_{44} = \cos(\beta)$ (28)

$$\gamma = \frac{1}{2}\tan^{-1}\left(\frac{-C_2 A_{22} + C_1 A_{23}}{C_1 A_{22} + C_2 A_{23}}\right) \quad (29)$$

or $$\gamma = \frac{1}{2}\tan^{-1}\left(\frac{C_3 A_{23} - C_2 A_{33}}{-C_2 A_{23} + C_1 A_{33}}\right) \quad (30)$$

thereinto, $$A_{22} = -\cos(2\alpha)[1-\cos(\beta)]\sin(2\alpha)\sin(2\gamma) + [\cos(2\alpha)^2 + \cos(\beta)\sin(2\alpha)^2]\cos(2\gamma) \quad (31)$$

$$A_{23} = \cos(2\alpha)[1-\cos(\beta)]\sin(2\alpha)\cos(2\gamma) + [\cos(2\alpha)^2 + \cos(\beta)\sin(2\alpha)^2]\sin(2\gamma) \quad (32)$$

$$A_{33} = \cos(2\alpha)[1-\cos(\beta)]\sin(2\alpha)\sin(2\gamma) + [\cos(2\alpha)^2 \cos(\beta) + \sin(2\alpha)^2]\cos(2\gamma) \quad (33)$$

Or $$2\gamma = \tan^{-1}\left(-\frac{A_{42}}{A_{43}}\right) - 2\alpha \quad (34)$$

Accordingly, the other three optical parameters are solved, namely, slow axis orientation angle $\alpha$, retardance $\beta$ and optical rotation angle $\gamma$.

Optical parameters could also be the other types in accordance with the said Mueller matrixes and solving equations of Stokes vector, for example, the said solving equations of slow axis orientation angle $\alpha$ consist of parameters $A_{24}$ and $A_{34}$, however, solving equations of slow axis orientation angle $\alpha$ also could be acquired other types of parameters according to the exemplary embodiments, thus the parameters with different sorts can be obtained, but can be regarded as equivalent solutions of slow axis orientation angle $\alpha$.

The to-be-measured optical parameter object might be known only in terms of slow axis orientation angle $\alpha$, retardance $\beta$ and optical rotation angle $\gamma$ before measuring, whereas other optical parameters (orientation axis angle $\theta_d$, linear dichroism D, value of circular amplitude anisotropy R) are not known. In this case, Mueller matrixes instead of identity matrixes (take the Mueller matrixes of dichroism for example) may be applied to solve the equation.

The above six optical parameters are thus acquired on the basis of the calculating Module. The establishment of Mueller matrixes do not require the calculating module, as a function of calculating module is to calculate the above optical parameters in accordance with the said Mueller matrixes and Stokes vector.

Next acquisition of the optical parameters of linear depolarization and circular depolarization when the object is of scattering properties is disclosed.

The exemplary optical parameter measuring process may include establishing Mueller matrixes of linear depolarization and circular depolarization of the object, as well as Stokes vector established in accordance with these Mueller matrixes.

Mueller matrixes of linear depolarization and circular depolarization may be established as follows:

$$M_\Delta = \begin{bmatrix} 1 & 0 & 0 & 0 \\ p_1 & e_1 & 0 & 0 \\ p_2 & 0 & e_2 & 0 \\ p_3 & 0 & 0 & e_3 \end{bmatrix} \text{ and } |e_1|, |e_2|, |e_3| \le 1 \qquad (35)$$

Among it, $P_1$, $P_2$, $P_3$ are elements of polarizance vector, $e_1$ and $e_2$ is the optical parameters of degrees of linear depolarization, $e_3$ is the optical parameter of degree of circular depolarization. The Stokes vector can also be established in accordance with these Mueller matrixes:

$$S_c = \begin{bmatrix} S_0 \\ S_1 \\ S_2 \\ S_3 \end{bmatrix}_c = [M_\Delta][M_{lb}][M_{cb}][M_{ld}][M_{cd}] \qquad (36)$$

$$\hat{S}_c = \begin{pmatrix} m_{11} & m_{12} & m_{13} & m_{14} \\ m_{21} & m_{22} & m_{23} & m_{24} \\ m_{31} & m_{32} & m_{33} & m_{34} \\ m_{41} & m_{42} & m_{43} & m_{44} \end{pmatrix} \begin{pmatrix} \hat{S}_0 \\ \hat{S}_1 \\ \hat{S}_2 \\ \hat{S}_3 \end{pmatrix}_c$$

The three optical parameters of orientation axis angle $\theta_d$, linear dichroism D, value of circular amplitude anisotropy R is obtained in accordance with equation (16) to (20), as explained above.

The other 6 parameters, that's $\alpha$, $\beta$, $\gamma$, $e_1$, $e_2$, $e_3$, can be solved in the light of the following birefringence, dichroism and Mueller matrixes of depolarization, Mueller matrixes of birefringence and depolarization.

Birefringence, dichroism and Mueller matrixes of depolarization:

birefringence and Mueller matrixes of depolarization:

$$M_{\Delta \cdot B} = [M_\Delta][M_{lb}][M_{cb}] \qquad (38)$$

$$= \begin{pmatrix} 1 & 0 & 0 & 0 \\ p_1 & e_1 A_{22} & e_1 A_{23} & e_1 A_{24} \\ p_2 & e_2 A_{32} & e_2 A_{33} & e_2 A_{34} \\ p_3 & e_3 A_{42} & e_3 A_{43} & e_3 A_{44} \end{pmatrix}$$

$$= \begin{pmatrix} n_{11} & n_{12} & n_{13} & n_{14} \\ n_{21} & n_{22} & n_{23} & n_{24} \\ n_{31} & n_{32} & n_{33} & n_{34} \\ n_{41} & n_{42} & n_{43} & n_{44} \end{pmatrix}$$

Thus the result is obtained:

$$\beta = \tan^{-1}\left(-\frac{A_{43}}{\cos(2\alpha+2\gamma)A_{44}}\right) \qquad (39)$$

$$\alpha = \frac{1}{2}\tan^{-1}\left(\frac{-(n_{22}n_{42}+n_{23}n_{43})}{\cos(\beta)(n_{22}n_{43}-n_{23}n_{42})}\right) \qquad (40)$$

Or $$\alpha = \frac{1}{2}\tan^{-1}\left(\frac{\cos(\beta)(n_{32}n_{43}-n_{33}n_{42})}{n_{32}n_{42}+n_{33}n_{43}}\right) \qquad (41)$$

$$\gamma = \frac{1}{2}\tan^{-1}\left(\frac{-C_2 n_{22}+C_1 n_{23}}{C_1 n_{22}+C_2 n_{23}}\right) \qquad (42)$$

Or $$\gamma = \frac{1}{2}\tan^{-1}\left(-\frac{n_{42}}{n_{43}}\right) - \alpha \qquad (43)$$

$$N_1 = \sin(2\alpha)\sin\beta \qquad (44)$$

$$N_2 = -\cos(2\alpha)\sin\beta \qquad (45)$$

$$N_3 = \cos\beta \qquad (46)$$

$$e_1 = \frac{n_{24}}{N_1} = \frac{(e_1 A_{24})}{N_1} \qquad (47)$$

$$e_2 = \frac{n_{34}}{N_2} = \frac{(e_2 A_{34})}{N_2} \qquad (48)$$

$$e_3 = \frac{n_{44}}{N_3} = \frac{(e_3 A_{44})}{N_3} \qquad (49)$$

At this point, 6 optical parameters has been acquired: slow axis orientation angle $\alpha$, retardance $\beta$, optical rotation angle $\gamma$, degrees of linear depolarization $e_1$ and $e_2$, degree of circular depolarization $e_3$. The solved equation of optical parameters include the functions of other optical parameters; however, after some mathematics derivations, the optical parameters will offset in these equations, as a result, there only remains $$M_{\Delta BD} = \begin{pmatrix} B_{11} & B_{12} & B_{13} & B_{14} \\ p_1 B_{11} + e_1(A_{22}B_{12}+A_{23}B_{13}+A_{24}B_{41}) & p_1 B_{12} + e_1(A_{22}B_{22}+A_{23}B_{23}) & p_1 B_{13} + e_1(A_{22}B_{23}+A_{23}B_{33}) & p_1 B_{14} + e_1(A_{22}B_{24}+A_{23}B_{34}+A_{24}B_{44}) \\ p_2 B_{11} + e_2(A_{32}B_{12}+A_{33}B_{13}+A_{34}B_{41}) & p_2 B_{12} + e_2(A_{32}B_{22}+A_{33}B_{23}) & p_2 B_{13} + e_2(A_{32}B_{23}+A_{33}B_{33}) & p_2 B_{14} + e_2(A_{32}B_{24}+A_{33}B_{34}+A_{34}B_{44}) \\ p_3 B_{11} + e_3(A_{42}B_{12}+A_{43}B_{13}+A_{44}B_{41}) & p_3 B_{12} + e_3(A_{42}B_{22}+A_{43}B_{23}) & p_3 B_{13} + e_3(A_{42}B_{23}+A_{43}B_{33}) & p_3 B_{14} + e_3(A_{42}B_{24}+A_{43}B_{34}+A_{44}B_{44}) \end{pmatrix} \qquad (37)$$

the functions of Stokes vector from the experiments in the equations, namely, the solved equations of optical parameters are decoupling. Therefore, the exemplary embodiments may be applied to solve the desired optical parameters.

The exemplary embodiments aim to establish an optical parameter module for nonscattered or scattering objects, so there is no need to solve the 6 or 9 optical parameters every time. One can solve the desired optical parameters in accordance with the properties of the objects or other demands, for example, if one just wants to obtain 1 or 3 optical parameters, on the occasion, for instance, some Mueller matrixes could be set to identity matrixes; therefore, any numbers of optical parameters from 1 to 9 could be solved. The reason for the above effect is that optical parameter in the module of this invention is decoupling.

The following tests are made for the exemplary embodiments.

Figure 3:
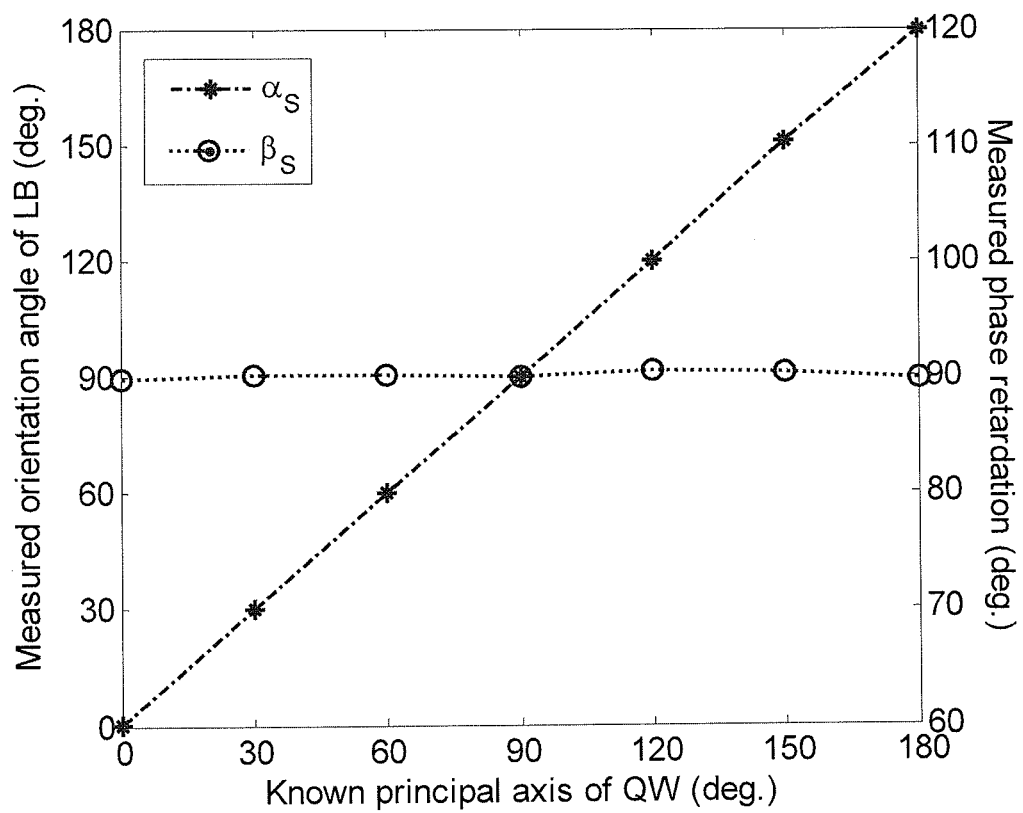
FIG. 3 illustrates examination of an optical parameter of linear birefringence using of a quarter-wave plate, including the experimental result of slow axis orientation angle α and retardance β, according to an exemplary embodiment.

FIG. 3 illustrates optical parameters of linear birefringence taking use of quarter-wave plate, including the experimental result of slow axis orientation angle α and retardance β.

Figure 4:
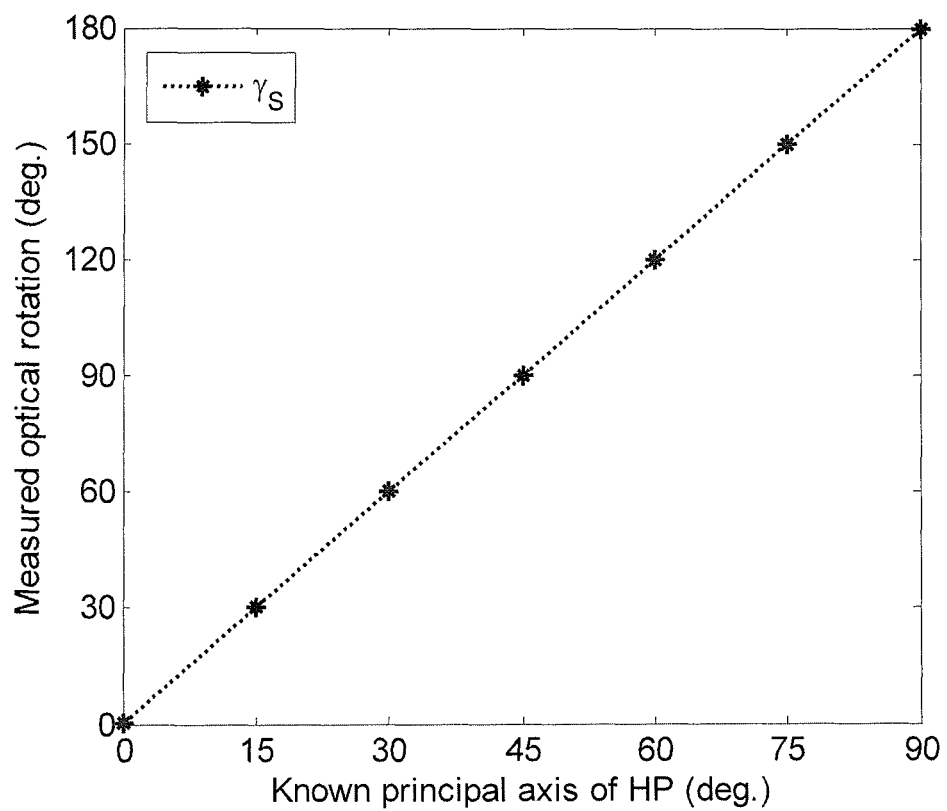
FIG. 4 illustrates optical parameters of circular birefringence taking use of half-wave plate including the experimental result of optical rotation angle γ, according to an exemplary embodiment.

FIG. 4 illustrates exam optical parameters of circular birefringence taking use of half-wave plate, including the experimental result of optical rotation angle γ.

Figure 5:
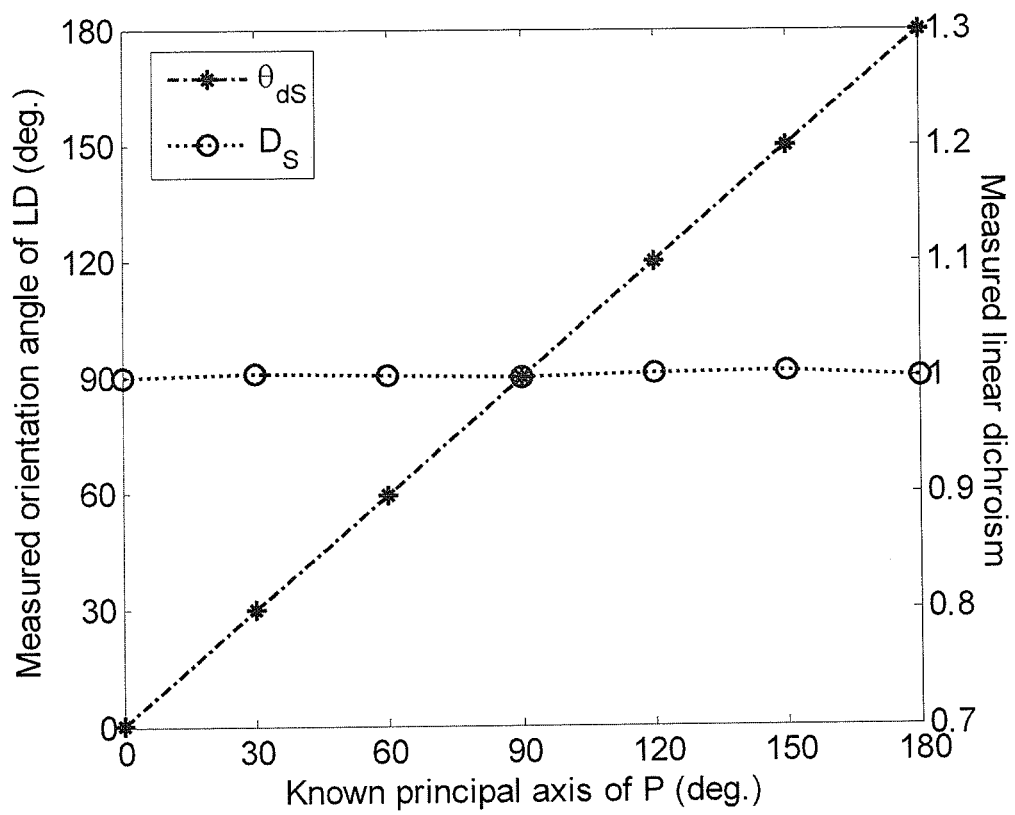
FIG. 5 illustrates optical parameters of linear dichroism taking use of an exemplary polarizer, including the experimental result of orientation axis angle $\theta_d$ and dichroism D.

FIG. 5 illustrates exam optical parameters of linear dichroism taking use of polarizer, including the experimental result of orientation axis angle $\theta_d$ and dichroism D.

Figure 6:
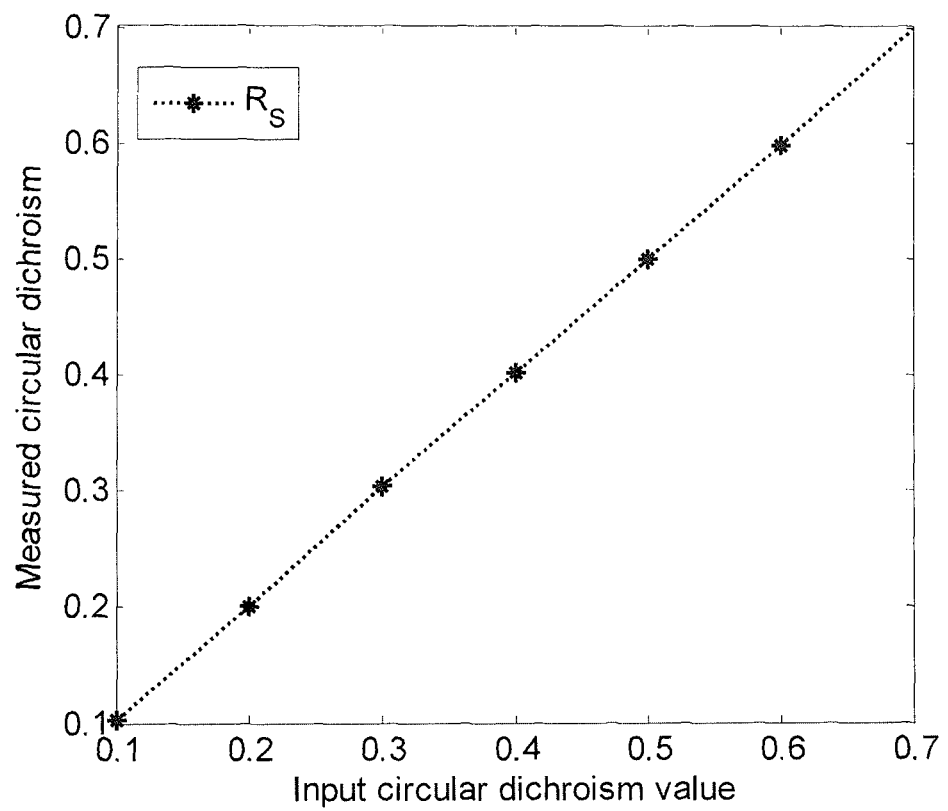
FIG. 6 illustrates optical parameters of circular dichroism taking use of an exemplary polarization controller, including the experimental result of value of circular amplitude anisotropy R.

FIG. 6 illustrates optical parameters of circular dichroism taking use of polarization controller: the experimental result of value of circular amplitude anisotropy R. Among it, the polarization controller consists of 2 quarter-wave plates and a half-wave plate.

Figure 7:
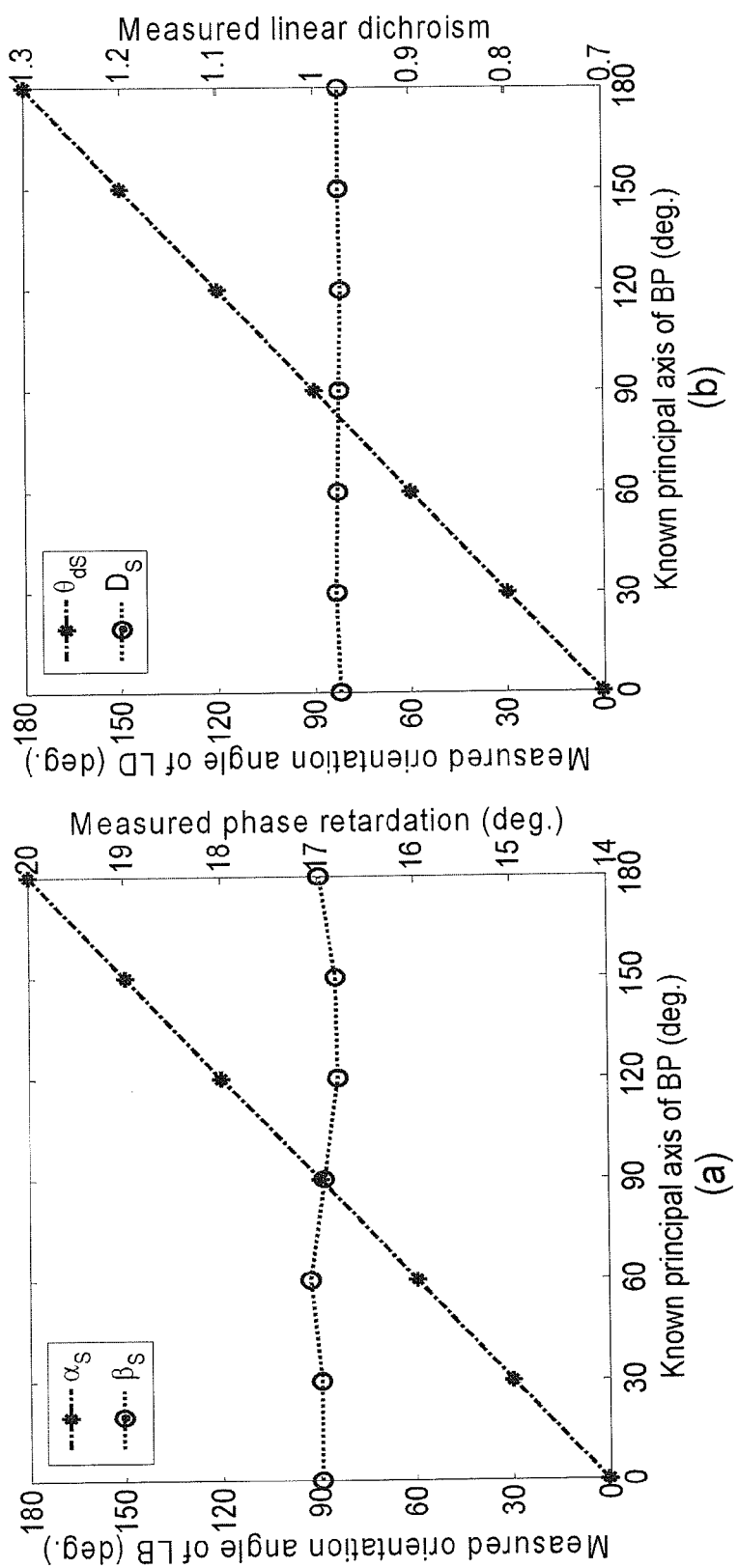
FIG. 7 illustrates optical parameters of linear birefringence and linear dichroism taking use of exemplary baked polarizer, including the experimental result of slow axis orientation angle α and retardance β, dichroism axis angle $\theta_d$ and linear dichroism D.

FIG. 7 illustrates optical parameters of linear birefringence and linear dichroism taking use of an exemplary baked polarizer: the experimental result of slow axis orientation angle α and retardance β, orientation axis angle $\theta_d$ and linear dichroism D.

Figure 8:
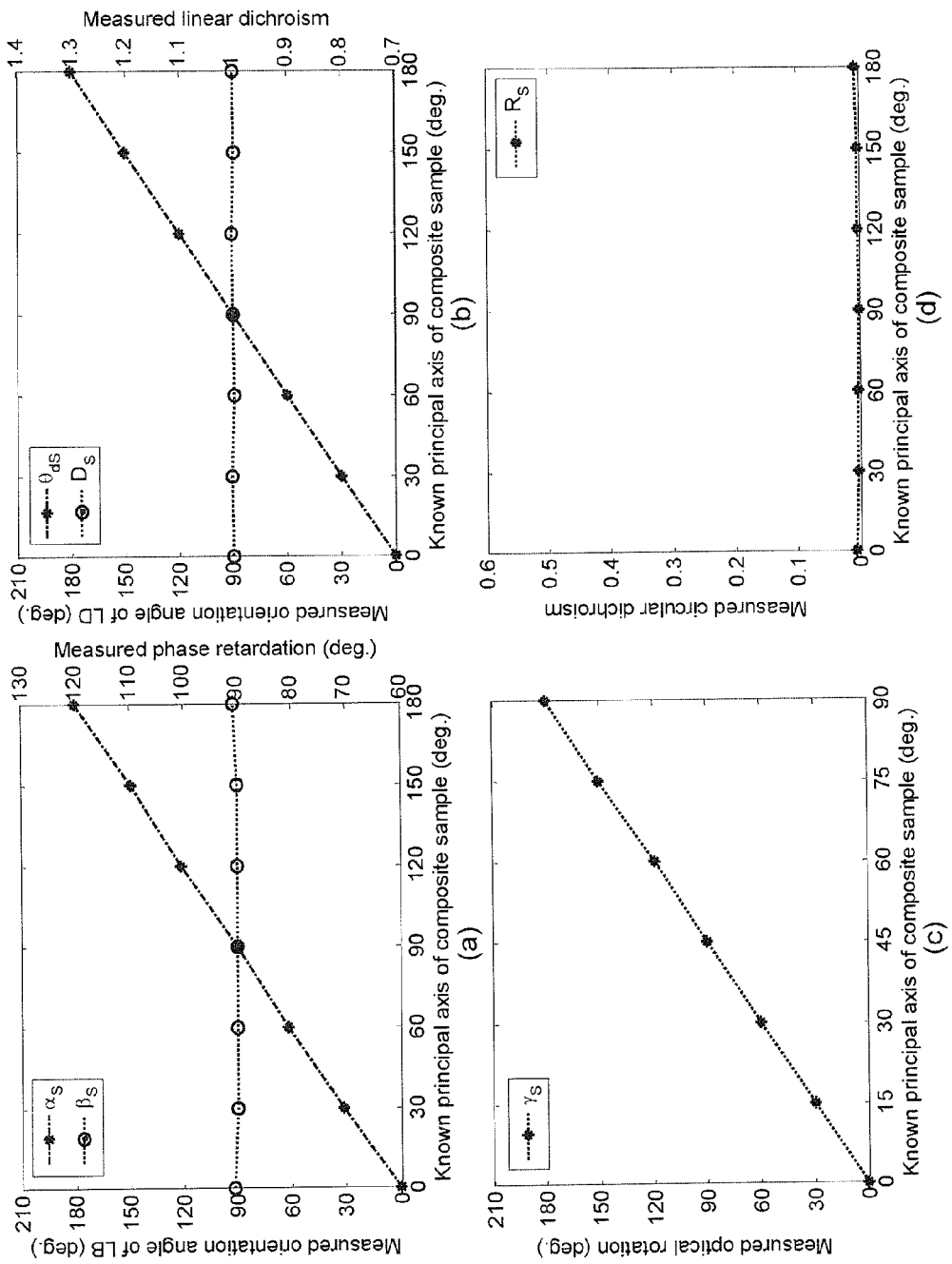
FIG. 8 illustrates optical parameters of linear birefringence/circular birefringence and linear dichroism taking use of an exemplary composite object, including the experimental result of slow axis orientation angle α and retardance β, optical rotation angle γ, dichroism axis angle $\theta_d$ and linear dichroism D.

FIG. 8 is to exam optical parameters of linear birefringence/circular birefringence and linear dichroism taking use of an exemplary composite object, including the experimental result of orientation axis angle α and retardance β, optical rotation angle γ, orientation axis angle $\theta_d$ and dichroism D. The composite sample includes a quarter-wave plate, a half-wave plate and a polarizer.

According to the tests, derivation module of the optical parameters can solve any optical parameter of the object and establish a universal optical parameter measuring apparatus which can be applied to single-point measurement and full-field measurement.

In conclusion, exemplary embodiments propose an unprecedented derivation module of the optical parameter, including, to establish Mueller matrixes of linear birefringence of object, to establish Mueller matrixes of circular birefringence of object, to establish Mueller matrixes of linear dichroism of object, to establish Mueller matrixes of circular dichroism of object, in addition, to the object with scattering property, the Mueller matrixes of linear depolarization and the circular depolarization as well as Stokes vector established by theses Mueller matrixes could be established.

As a result, 9 optical parameters including the said optical properties could be solved in the form of decoupling. In other words, optical parameters do not have mutual interference or a cross-talk effect. Accordingly, the inventive concept integrates most optical parameters measuring in a single measuring apparatus, which improves value and efficiency. Besides, an optical parameter measuring apparatus and optical parameter measuring approach does not require to parallel the birefringence axis and dichroism axis, and then extend the range of measuring objects.

The above explanations are just examples but not limitations. Any equivalent modification or alternation to the spirit and scope of the inventive concept should be comprised in the following texts and please attach them in the application scope.

We claim:

1. An optical parameter measuring apparatus to measure optical parameters of an object, comprising:

a light source that radiates light onto the object;

a polarizing module that converts the light from the light source into six polarizing lights prior to being incident onto the object;

a Stokes polarimeter that receives the polarizing lights that have passed through the object and respectively generates light information according to the received polarizing lights passing through the object; and a calculating module that calculates optical parameters of a plurality of Mueller matrixes of the object in accordance with the light information respectively produced by the Stokes polarimeter, including a linear birefringence, a circular birefringence, a linear dichroism, a circular dichroism and a Stokes vector, wherein the optical parameters of Mueller matrixes of the linear birefringence include a slow axis orientation angle and a retardance, wherein the optical parameters of Mueller matrixes of the linear dichroism include an orientation axis angle and a dichroism, wherein the optical parameter of Mueller matrixes of the circular birefringence includes an optical rotation angle, and wherein the optical parameter of Mueller matrixes of the circular dichroism includes a value of circular amplitude anisotropy.

2. The apparatus of claim 1, wherein the polarizing module further includes at least one of a polarizer and a wave plate.

3. The apparatus of claim 1, wherein the calculating module calculates an optical parameter of Mueller matrixes of a linear depolarization and a circular depolarization in accordance with the Mueller matrixes of the linear depolarization and the circular depolarization of the object and the Stokes vector.

4. The apparatus of claim 3, wherein the Mueller matrixes of linear depolarization and circular depolarization comprise optical parameters of plural degrees of linear depolarization and an optical parameter of a degree of circular depolarization.

5. The apparatus of claim 1, wherein the object is an anisotropic optical object having anisotropic or scattering properties.

6. The apparatus of claim 1, wherein at least one Mueller matrix comprises an identity matrix.

7. The apparatus of claim 1, wherein the slow axis orientation angle is denoted as "α," wherein the retardance is denoted as "β," and wherein the Mueller matrix of the linear birefringence is represented by:

$$M = \begin{bmatrix} 1 & 0 & 0 & 0 \\ 0 & \cos(4\alpha)\sin^2(\beta/2) + \cos^2(\beta/2) & \sin(4\alpha)\sin^2(\beta/2) & \sin(2\alpha)\sin(\beta) \\ 0 & \sin(4\alpha)\sin^2(\beta/2) & -\cos(4\alpha)\sin^2(\beta/2) + \cos^2(\beta/2) & -\cos(2\alpha)\sin(\beta) \\ 0 & -\sin(2\alpha)\sin(\beta) & \cos(2\alpha)\sin(\beta) & \cos(\beta) \end{bmatrix}.$$

8. The apparatus of claim 1, wherein the orientation axis angle is denoted as "$\theta_d$," wherein the dichroism is denoted as "D," and wherein the Mueller matrix of the linear dichroism is represented by:

$$M = \begin{bmatrix} \frac{1}{2}\left(1 + \frac{1-D}{1+D}\right) & \frac{1}{2}\cos(2\theta_d)\left(1 - \frac{1-D}{1+D}\right) & \frac{1}{2}\sin(2\theta_d)\left(1 - \frac{1-D}{1+D}\right) & 0 \\ \frac{1}{2}\cos(2\theta_d)\left(1 - \frac{1-D}{1+D}\right) & \frac{1}{4}\left(\left(1 + \sqrt{\frac{1-D}{1+D}}\right)^2 + \cos(4\theta_d)\left(1 - \sqrt{\frac{1-D}{1+D}}\right)^2\right) & \frac{1}{4}\sin(4\theta_d)\left(1 - \sqrt{\frac{1-D}{1+D}}\right)^2 & 0 \\ \frac{1}{2}\sin(2\theta_d)\left(1 - \frac{1-D}{1+D}\right) & \frac{1}{4}\sin(4\theta_d)\left(1 - \frac{1-D}{1+D}\right)^2 & \frac{1}{4}\left(\left(1 + \sqrt{\frac{1-D}{1+D}}\right)^2 - \cos(4\theta_d)\left(1 - \sqrt{\frac{1-D}{1+D}}\right)^2\right) & 0 \\ 0 & 0 & 0 & \sqrt{\frac{1-D}{1+D}} \end{bmatrix}.$$

9. The apparatus of claim 1, wherein the optical rotation angle is denoted as "$\gamma$," and wherein the Mueller matrix of the circular birefringence is represented by:

$$M = \begin{bmatrix} 1 & 0 & 0 & 0 \\ 0 & \cos(2\gamma) & \sin(2\gamma) & 0 \\ 0 & -\sin(2\gamma) & \cos(2\gamma) & 0 \\ 0 & 0 & 0 & 1 \end{bmatrix}.$$

10. The apparatus of claim 1, wherein the value of circular amplitude anisotropy is denoted as "R," and wherein the Mueller matrix of the circular dichroism is represented by:

$$M = \begin{bmatrix} 1+R^2 & 0 & 0 & 2R \\ 0 & 1-R^2 & 0 & 0 \\ 0 & 0 & 1-R^2 & 0 \\ 2R & 0 & 0 & 1+R^2 \end{bmatrix}.$$

11. An optical parameter measuring process for measuring optical parameters of an object, comprising:

establishing Mueller matrixes of a linear birefringence, a circular birefringence, a linear dichroism and a circular dichroism of the object, as performed by a calculating module;

establishing a Stokes vector in accordance with the Mueller matrixes, as performed by the calculating module;

irradiating the object with at least six different polarizing lights, as performed by a light source;

receiving the at least six different polarizing lights that have passed through the object, as performed by a Stokes polarimeter; and calculating optical parameters of Mueller matrixes in accordance with the established Mueller matrixes, as performed by the calculating module, wherein the optical parameters of the Mueller matrixes of the linear birefringence include a slow axis orientation angle and a retardance, wherein the optical parameters of the Mueller matrixes of the linear dichroism include an orientation axis angle and a dichroism, wherein the optical parameter of the Mueller matrixes of the circular birefringence includes an optical rotation angle, and wherein the optical parameter of the Mueller matrixes of the circular dichroism includes a value of circular amplitude anisotropy.

12. The process of claim 11, comprising, to establish the Mueller matrixes of linear depolarization and circular depolarization, to establish the Stokes vector in accordance with the Mueller matrixes.

13. The process of claim 12, wherein the Mueller matrixes of the linear depolarization and circular depolarization comprise optical parameters of plural degrees of linear depolarization and an optical parameter of a circular degree of circular depolarization.

14. The process of claim 11, wherein the slow axis orientation angle is denoted as "$\alpha$," wherein the retardance is denoted as "$\beta$," and wherein the Mueller matrix of the linear birefringence is represented by:

$$M = \begin{bmatrix} 1 & 0 & 0 & 0 \\ 0 & \cos(4\alpha)\sin^2(\beta/2) + \cos^2(\beta/2) & \sin(4\alpha)\sin^2(\beta/2) & \sin(2\alpha)\sin(\beta) \\ 0 & \sin(4\alpha)\sin^2(\beta/2) & -\cos(4\alpha)\sin^2(\beta/2) + \cos^2(\beta/2) & -\cos(2\alpha)\sin(\beta) \\ 0 & -\sin(2\alpha)\sin(\beta) & \cos(2\alpha)\sin(\beta) & \cos(\beta) \end{bmatrix}.$$

15. The process of claim 11, wherein the orientation axis angle is denoted as "$\theta_d$," wherein the dichroism is denoted as "D," and wherein the Mueller matrix of the linear dichroism is represented by:

$$M = \begin{bmatrix} \frac{1}{2}\left(1+\frac{1-D}{1+D}\right) & \frac{1}{2}\cos(2\theta_d)\left(1-\frac{1-D}{1+D}\right) & \frac{1}{2}\sin(2\theta_d)\left(1-\frac{1-D}{1+D}\right) & 0 \\ \frac{1}{2}\cos(2\theta_d)\left(1-\frac{1-D}{1+D}\right) & \frac{1}{4}\left(\left(1+\sqrt{\frac{1-D}{1+D}}\right)^2 + \cos(4\theta_d)\left(1-\sqrt{\frac{1-D}{1+D}}\right)^2\right) & \frac{1}{4}\sin(4\theta_d)\left(1-\sqrt{\frac{1-D}{1+D}}\right)^2 & 0 \\ \frac{1}{2}\sin(2\theta_d)\left(1-\frac{1-D}{1+D}\right) & \frac{1}{4}\sin(4\theta_d)\left(1-\frac{1-D}{1+D}\right)^2 & \frac{1}{4}\left(\left(1+\sqrt{\frac{1-D}{1+D}}\right)^2 - \cos(4\theta_d)\left(1-\sqrt{\frac{1-D}{1+D}}\right)^2\right) & 0 \\ 0 & 0 & 0 & \sqrt{\frac{1-D}{1+D}} \end{bmatrix}.$$

16. The process of claim 11, wherein the optical rotation angle is denoted as "$\gamma$," and wherein the Mueller matrix of the circular birefringence is represented by:

$$M = \begin{bmatrix} 1 & 0 & 0 & 0 \\ 0 & \cos(2\gamma) & \sin(2\gamma) & 0 \\ 0 & -\sin(2\gamma) & \cos(2\gamma) & 0 \\ 0 & 0 & 0 & 1 \end{bmatrix}.$$

17. The process of claim 11, wherein the value of circular amplitude anisotropy is denoted as "R," and wherein the Mueller matrix of the circular dichroism is represented by:

$$M = \begin{bmatrix} 1+R^2 & 0 & 0 & 2R \\ 0 & 1-R^2 & 0 & 0 \\ 0 & 0 & 1-R^2 & 0 \\ 2R & 0 & 0 & 1+R^2 \end{bmatrix}.$$

* * * * *